United States Patent Office 3,341,630
Patented Sept. 12, 1967

3,341,630
PENTAFLUOROPHENYL PHOSPHORYL CHLORIDES
Robert H. Boschan, Los Angeles, and James P. Holder, Woodland Hills, Calif., assignors, by mesne assignments, to McDonnell Douglas Corporation, Santa Monica, Calif., a corporation of Maryland
No Drawing. Filed May 4, 1964, Ser. No. 364,756
4 Claims. (Cl. 260—955)

ABSTRACT OF THE DISCLOSURE

Production of pentafluorophenyl phosphoryl dichloride and bis(pentafluorophenyl) phosphoryl chloride, by reacting pentafluorophenol with phosphorus oxychloride, such pentafluorophenyl phosphoryl chloride compounds being particularly useful as intermediates for the preparation of pentafluorophenyl phosphate esters.

---

This invention relates to novel polyfluorinated phosphoryl chloride derivatives, and is particularly concerned with the provision of novel pentafluorophenyl phosphoryl chloride compounds particularly useful as intermediates for the preparation of pentafluorophenyl phosphate esters.

In the copending application Ser. No. 364,787, filed of even date herewith, entitled "Polyfluorinated Phosphate Esters," of Christian A. Seil, Robert H. Boschan and James P. Holder, there is described and claimed a novel class of pentafluorophenyl phosphates, including dialkyl pentafluorophenyl phosphates and bis(pentafluorophenyl) alkyl phosphates.

Said pentafluorophenyl phosphates, as described in the above copending application, are particularly valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, these fluorinated phosphate esters have a thermal stability in the range of about 400 to about 700° F., have autoignition temperatures up to and in excess of 1000° F., and remain liquid down to a temperature of the order of −40 to −100° F. Further, the viscosity of such pentafluorophenyl phosphate esters at low temperatures of the order of −40 to−100° F. permits the operative use of such liquids as hydraulic fluids, cooling media and lubricants in these low temperature ranges. These compounds are also relatively non-volatile at elevated temperatures due to the high boiling point of these materials. Also, such phosphate esters, particularly the dialkyl pentafluorophenyl phosphates, have relatively low pour points, e.g., of the order of −75° F. to −100° F., or lower, which, together with the relatively low viscosity of these materials at low temperatures, permit the liquid compounds to be pumped without high expenditure of energy at low temperatures. Moreover, such phosphate esters have good hydrolytic stability, and do not adversely affect materials, such as metals, e.g., steel, copper, and the like, with which they may be in contact.

The intermediates of the invention, which are particularly valuable for preparing the above-noted phosphate esters, are the pentafluorophenyl phosphoryl chlorides, such compounds having the following formulae:

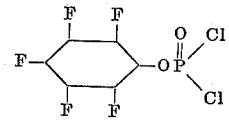

Pentafluorophenyl phosphoryl dichloride, and

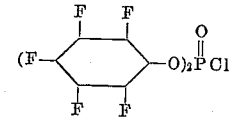

Bis(pentafluorophenyl) phosphoryl chloride

Such pentafluorophenyl phosphoryl chloride compounds are prepared by reacting pentafluorophenol with phosphorus oxychloride, POCl₃. When it is desired to obtain essentially pentafluorophenyl phosphoryl dichloride, about 1 mole of the pentafluorophenol is employed per mole of phosphorus oxychloride, and when it is desired to obtain essentially bis(pentafluorophenyl) phosphoryl chloride, about 2 moles of pentafluorophenol are utilized per mole of phosphorus oxychloride. A mixture of these compounds can be obtained by employing in excess of 2 moles of pentafluorophenol per mole of phosphorus oxychloride and the two compounds pentafluorophenyl phosphoryl dichloride and bis(pentafluorophenyl) phosphoryl chloride separated from the mixture by distillation at reduced pressure, such compounds having widely separated boiling points at reduced pressure. Usually an excess of POCl₃ is employed.

The reaction for producing such pentafluorophenyl phosphoryl chlorides is carried out by heating the reaction mixture of the pentafluorophenol and phosphorus oxychloride for a period of time, usually several hours, until the reaction is substantially completed. The excess phosphorus oxychloride is removed by distillation, usually at atmospheric pressure, and the residue including the reaction product pentafluorophenyl phosphoryl dichloride and/or bis(pentafluorophenyl) phosphoryl chloride is distilled at reduced pressure to recover the desired pentafluorophenyl phosphoryl chloride product or products.

The following are examples of preparation of the pentafluorophenyl phosphoryl chloride compounds of the invention:

EXAMPLE 1

To 97.2 g. (0.528 mole) of pentafluorophenol were added dropwise with stirring 153.5 g. (1.00 mole) of redistilled phosphorus oxychloride. The temperature was maintained at 20°–26° C. during the addition, which was complete in ¾ hour. The mixture was then refluxed for one hour at 129° C., then cooled to 120° C., and maintained at 120° C. for 66 hours. The mixture was heated to 125° C. for 21½ hours, and then cooled. The phosphorus oxychloride was removed by distillation at atmospheric pressure.

The residue or remainder of the reaction mixture containing both pentafluorophenyl phosphoryl dichloride and bis(pentafluorophenyl) phosphoryl chloride, was distilled at reduced pressure to recover these compounds separately. At 20 mm. mercury pressure, the pentafluorophenyl phosphoryl dichloride distilled over at 112–125° C., recovering 28.7 g. of this compound, and the bis(pentafluorophenyl) phosphoryl chloride distilled over at 181–183° C., recovering 47.9 g. of this material.

EXAMPLE 2

The procedure of Example 1 is substantially repeated, except employing about 0.55 mole of phosphorus oxychloride corresponding to about a one to one molar ratio of pentafluorophenol to $POCl_3$.

Substantially all of the product which is produced is pentafluorophenyl phosphoryl chloride.

EXAMPLE 3

The procedure of Example 1 is substantially repeated, except employing about 0.3 mole of phosphorus oxychloride, corresponding to about 2 moles of pentafluorophenol per mole of $POCl_3$.

Substantially all of the product which is produced is bis(pentafluorophenyl)phosphoryl chloride.

The following are examples of use of the pentafluorophenyl phosphoryl chloride compounds as intermediates for the production of the pentafluorophenyl phosphates of the above copending application.

EXAMPLE 4

Dibutyl pentafluorophenyl phosphate

To a mixture of 13.8 g. (0.186 mole) of redistilled n-butyl alcohol, 14.7 g. (0.186 mole) of pyridine, and 35 ml. of benzene were added dropwise with stirring 25.4 g. (0.0844 mole) of pentafluorophenyl phosphoryl dichloride. The temperature was maintained at 26°–43° C. durring the addition, which was complete in 45 minutes. The mixture was mixed for 15 minutes at 30° C., then heated to reflux temperature and allowed to reflux overnight. The mixture was then cooled and poured into four times its volume of water. The bottom organic layer was drawn off and the aqueous layer was extracted with one 80 ml. portion and two 20 ml. portions of ether; these ether extracts were then added to the organic layer, which was then washed with successive 20 ml. portions of 5% hydrochloric acid, water, and 5% sodium bicarbonate. After drying over anhydrous magnesium sulfate, the solvents were evaporated on a steam bath, and the residue was distilled at 0.15–0.16 mm. mercury. The main fraction of dibutyl pentafluorophenyl phosphate, 12.6 g., distilled at 102–106° C. (0.15–0.16 mm. mercury).

The resulting dibutyl pentafluorophenyl phosphate, has a density at 77° F. of 1.24 g./ml., a kinematic viscosity at −40° F. of 263 centistokes and at −65° F. of 1432 centistokes, and a pour point below −100° F. The compound remains liquid over a broad temperature range. In addition, such phosphate has bood thermal stability, high autoignition temperature, good hydrolytic stability, and high fire resistance. Such phosphate serves particularly as a hydraulic fluid or lubricant in an aircraft system.

EXAMPLE 5

Bis(pentafluorophenyl) butyl phosphate

The procedure of Example 4 is substantially carried out except employing about 0.09 mole of n-butyl alcohol and about .09 mole bis(pentafluorophenyl) phosphoryl chloride, instead of the pentafluorophenyl phosphoryl dichloride.

The product produced, consisting essentially of bis(pentafluorophenyl) butyl phosphate, has satisfactory viscosity at low temperatures, low pour point, good thermal stability, high autoignition temperature, good hydrolytic stability, and high fire resistance. Such phosphate is useful as a base stock for a hydraulic fluid of an aircraft system.

From the foregoing, it is seen that the invention provides novel pentafluorophenyl phosphoryl chloride compounds having particular value as intermediates for producing pentafluorophenyl phosphates, which are especially suited for use as base stocks of hydraulic fluids in aircraft systems, and which are also useful as lubricants and as heat transfer or cooling media in aircraft systems.

While we have described particular embodiments of our invention for the purpose of illustration, it should be understood that various modifications and adaptations thereof may be made within the spirit of the invention, as set forth in the appended claims.

We claim:
1. Pentafluorophenyl phosphoryl chlorides selected from the group consisting of pentafluorophenyl phosphoryl dichloride and bis(pentafluorophenyl) phosphoryl chloride.
2. Pentafluorophenyl phosphoryl dichloride.
3. Bis(pentafluorophneyl) phosphoryl chloride.
4. A mixture consisting essentially of pentafluorophenyl phosphoryl dichloride and bis(pentafluorophenyl) phosphoryl chloride.

No references cited.

CHARLES B. PARKER, *Primary Examiner.*

A. H. SUTTO, *Assistant Examiner.*